(12) United States Patent
Shimada et al.

(10) Patent No.: US 6,177,531 B1
(45) Date of Patent: Jan. 23, 2001

(54) WATER AND OIL REPELLENT COMPOSITON

(75) Inventors: Toyomichi Shimada; Kyoichi Kaneko; Shuichiro Sugimoto; Takashige Maekawa, all of Yokohama (JP)

(73) Assignee: Asahi Glass Company Ltd., Tokyo (JP)

( * ) Notice: Under 35 U.S.C. 154(b), the term of this patent shall be extended for 0 days.

(21) Appl. No.: 09/120,880

(22) Filed: Jul. 23, 1998

(30) Foreign Application Priority Data

Jul. 23, 1997 (JP) .................................................... 9-197504

(51) Int. Cl.$^7$ ......................... C08F 18/20; C08F 119/02; C08G 18/28; B05D 5/00
(52) U.S. Cl. ......................... 526/245; 526/319; 525/124; 524/589; 528/70; 528/75; 428/423.1; 427/372.2; 427/285
(58) Field of Search ..................................... 526/245, 319; 525/124; 524/589; 528/70, 75; 428/423.1; 427/372.2, 285

(56) References Cited

U.S. PATENT DOCUMENTS

| | | | |
|---|---|---|---|
| 3,997,507 | * 12/1976 | Kirimoto et al. | 526/287 |
| 4,859,754 | 8/1989 | Maekawa et al. | 360/314 |
| 5,100,954 | 3/1992 | Itoh et al. | 524/805 |
| 5,466,770 | 11/1995 | Audenaert et al. | |
| 5,578,688 | 11/1996 | Ito et al. | 526/245 |
| 5,688,309 | 11/1997 | Shimada et al. | 106/2 |

FOREIGN PATENT DOCUMENTS

| | | |
|---|---|---|
| 21 51 035 | * 2/1973 | (DE) . |
| 2 47 111 | * 4/1974 | (DE) . |
| 0 491 248 | 6/1992 | (EP) . |
| 0 617 061 | 9/1994 | (EP) . |
| 500020991 | * 3/1975 | (JP) . |
| 50026783 | * 11/1984 | (JP) . |
| 54132694 | * 11/1986 | (JP) . |
| WO 92/17636 | 10/1992 | (WO) . |

OTHER PUBLICATIONS

Derwent Abstracts, AN 87–188035, JP 62116613, May 28, 1987.

Derwent Abstracts, AN 94–313957, JP 06240239, Aug. 30, 1994.

Derwent Abstracts, AN 91–061048, JP 03008873, Jan. 16, 1991.

* cited by examiner

*Primary Examiner*—Bernard Lipman
*Assistant Examiner*—Tanya Zalukaeva
(74) *Attorney, Agent, or Firm*—Oblon, Spivak, McClelland, Maier & Neustadt, P.C.

(57) ABSTRACT

A water and oil repellent composition containing, as an effective component, a copolymer comprising the following polymeric units (a), (b) and at least one member selected from (c) and (d):

polymeric units (a): Polymeric units of a (meth)acrylate having a polyfluoroalkyl group;

Polymeric units (b): Polymeric units of 2-isocyanate ethyl (meth)acrylate with the isocyanate group blocked;

Polymeric units (c): Polymeric units of vinyl chloride; and

Polymeric units (d): Polymeric units of an alkyl (meth)acrylate.

17 Claims, No Drawings

WATER AND OIL REPELLENT COMPOSITON

WATER AND OIL REPELLENT COMPOSITION

The present invention relates to an water and oil repellent composition excellent in durability of water and oil repellency and durability of water resistance.

In recent years, treatment of clothings, etc., for water and oil repellency and for water resistance has been common, and various compositions containing copolymers having polyfluoroalkyl groups have been proposed depending upon the particular purposes. (In this specification, a polyfluoroalkyl group will be hereinafter referred to as "a $R^f$ group". Further, an acrylate and/or a methacrylate will be referred to as "a (meth)acrylate". The same applies to other alkyl (meth)acrylates.)

For example, for sports and outdoor clothings, a high level of durability of water and oil repellency and water resistance against washing, dry cleaning, abrasion, etc., is required, and as a copolymer component to impart such durability, a copolymer of a (meth)acrylate having a $R^f$ group, a (meth)acrylate having a blocked isocyanate group arid a (meth)acrylate having a polyoxyalkylene chain, has been proposed (JP-A-6-279687).

Further, a copolymer of an acrylate having a $R^f$ group with vinyl chloride (JP-B-50-3438), a polymer of an acrylate having both a $R^f$ group and an aromatic blocked isocyanate group (JP-A-3-8873) or a copolymer of a (meth)acrylate having a $R^f$ group with a (meth)acrylate having an alicyclic or heterocyclic polyisocyanate group having a blocked isocyanate group (JP-A-6-240239) has been proposed.

Further, it has been proposed to copolymerize, as a crosslinking component to improve the durability, N-methylol acrylamide (JP-B-39-2350) or glycidyl methacrylate (JP-A-4-68006).

However, conventional compositions all had a drawback that no adequate durability against washing was obtainable. A copolymer containing polymeric units of a methacrylate having a polyoxyalkylene group, had a drawback that no adequate water repellency or water resistance was obtained. Further, in order to improve the durability, a method has also been known wherein a compound having a $R^f$ group and a melamine resin or a compound having a blocked isocyanate group, are used in combination for treatment of fibers. In this case, however, there has been yellowing of the cloth or hardening of the texture. Further, a method for improving water resistance by coating a polyurethane resin or an acrylic resin, has also been known. However, in this case, there is a drawback that the texture tends to be hard.

It is an object of the present invention to provide a water and oil repellent composition which is capable of imparting durable water and oil repellency and water resistance and which is free from a problem such as yellowing or hardening of the texture of a cloth.

The present invention provides a water and oil repellent composition containing, as an effective component, a copolymer comprising the following polymeric units (a), (b) and at least one member selected from (c) and (d):

polymeric units (a): Polymeric units of a (meth)acrylate having a polyfluoroalkyl group;

Polymeric units (b): Polymeric units of 2-isocyanate ethyl (meth)acrylate with the isocyanate group blocked;

Polymeric units (c): Polymeric units of vinyl chloride; and

Polymeric units (d): Polymeric units of an alkyl (meth) acrylate.

Now, the present invention will be described in detail with reference to the preferred embodiments.

The polymeric units (a) are polymeric units of a (meth) acrylate having a $R^f$ group. The (meth)acrylate having a $R^f$ group is meant for a group wherein a $R^f$ group is present in the alcohol residue of the (meth)acrylate.

The $R^f$ group is meant for a group having at least two hydrogen atoms of an alkyl group substituted by fluorine atoms. The carbon number of the $R^f$ group is preferably from 2 to 20, particularly preferably from 6 to 16. Further, the $R^f$ group is preferably a straight chain or branched group. When it is a branched group, it is preferred that the branched moiety is present at the terminal portion of the $R^f$ group, and it is of a short chain having from 1 to 4 carbon atoms. The $R^f$ group may contain halogen atoms other than fluorine atoms. As such other halogen atoms, chlorine atoms are preferred. Further, a carbon atom in the $R^f$ group may be substituted by an etheric oxygen atom.

The number of fluorine atoms in the $R^f$ group is preferably at least 60%, particularly preferably at least 80%, when represented by [(number of fluorine atoms in the $R^f$ group)/(number of hydrogen atoms contained in the corresponding alkyl group having the same carbon number)]×100(%). Further, the $R^f$ group is preferably a group having all of the hydrogen atoms of the alkyl group substituted by fluorine atoms (i.e. a perfluoroalkyl group), or a group having a perfluoroalkyl group at a terminal portion.

The carbon number of the perfluoroalkyl group is preferably from 2 to 20, particularly preferably from 6 to 16. If the carbon number is less than 6, the water repellency and the oil repellency of the water and oil repellent composition tend to decrease, and if it exceeds 16, the copolymer tends to be solid at room temperature, and the sublimation property tends to increase whereby the handling tends to be difficult.

As the (meth)acrylate having a $R^f$ group, a compound of the following formula (1) is preferred.

$$R^f\text{—Q—OCOCR}=\text{CH}_2 \tag{1}$$

In the formula (1), $R^f$ represents the $R^f$ group, Q is a bivalent organic group, and R is a hydrogen atom or a methyl group. The $R^f$ group is preferably those disclosed in the following specific examples and in Examples.

Q may, for example, be preferably —$(CH_2)_{p+q}$—, —$(CH_2)_p CONH(CH_2)_q$—, —$(CH_2)_p OCONH(CH_2)_q$—, —$(CH_2)_p SO_2 NR'(CH_2)_q$—, —$(CH_2)_p NHCONH(CH_2)_q$—, or —$(CH_2)_p$—CH(OH)—$(CH_2)_q$—, provided R' is a hydrogen atom or an alkyl group. Further, each of p and q which are independent of each other, is an integer of at least 0, and p+q is an integer of from 1 to 22. Preferred is the one wherein Q is —$(CH_2)_{p+q}$—, —$(CH_2)_p CONH(CH_2)_q$— or —$(CH_2)_p SO_2 NR'(CH_2)_q$—, and q is an integer of at least 2, and p+q is from 2 to 6. Particularly preferred is the one wherein Q is —$(CH_2)_{p+q}$— where p+q is from 2 to 6, i.e. from an ethylene group to a hexamethylene group. Further, it is preferred that a fluorine atom is bonded to the carbon atom of $R^f$ bonding to Q.

Now, specific examples of the (meth)acrylate having a $R^f$ group will be given below, wherein R is a hydrogen atom or a methyl group.

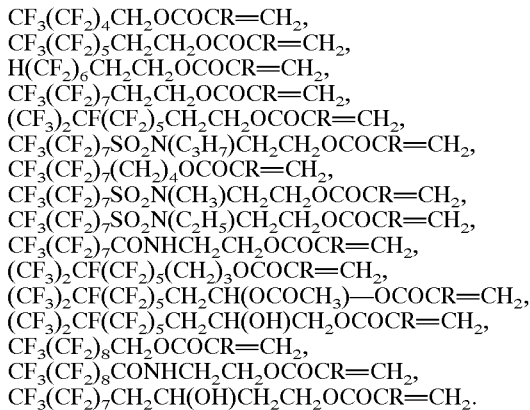

$CF_3(CF_2)_4CH_2OCOCR=CH_2$,
$CF_3(CF_2)_5CH_2CH_2OCOCR=CH_2$,
$H(CF_2)_6CH_2CH_2OCOCR=CH_2$,
$CF_3(CF_2)_7CH_2CH_2OCOCR=CH_2$,
$(CF_3)_2CF(CF_2)_5CH_2CH_2OCOCR=CH_2$,
$CF_3(CF_2)_7SO_2N(C_3H_7)CH_2CH_2OCOCR=CH_2$,
$CF_3(CF_2)_7(CH_2)_4OCOCR=CH_2$,
$CF_3(CF_2)_7SO_2N(CH_3)CH_2CH_2OCOCR=CH_2$,
$CF_3(CF_2)_7SO_2N(C_2H_5)CH_2CH_2OCOCR=CH_2$,
$CF_3(CF_2)_7CONHCH_2CH_2OCOCR=CH_2$,
$(CF_3)_2CF(CF_2)_5(CH_2)_3OCOCR=CH_2$,
$(CF_3)_2CF(CF_2)_5CH_2CH(OCOCH_3)-OCOCR=CH_2$,
$(CF_3)_2CF(CF_2)_5CH_2CH(OH)CH_2OCOCR=CH_2$,
$CF_3(CF_2)_8CH_2OCOCR=CH_2$,
$CF_3(CF_2)_8CONHCH_2CH_2OCOCR=CH_2$,
$CF_3(CF_2)_7CH_2CH(OH)CH_2CH_2OCOCR=CH_2$.

The copolymer of the present invention may contain one or more types of polymeric units (a). When it contains two or more different types of polymeric units (a), it is preferably a mixture of (meth)acrylates having $R^f$ groups with different carbon numbers.

The polymeric units (b) are polymeric units of 2-isocyanate ethyl (meth)acrylate wherein the isocyanate group is blocked. It has been unexpectedly found that by the presence of the polymeric units of 2-isocyanate ethyl methacrylate wherein the isocyanate group is blocked, not only the durability of water and oil repellency against natural fibers such as cotton, is remarkably improved, but also durability of water and oil repellency against a substrate having no functional groups reactive with isocyanate groups, such as polyester or polypropylene, is improved to a large extent.

The 2-isocyanate ethyl (meth)acrylate wherein the isocyanate group is blocked, can readily be obtained by reacting the isocyanate group of 2-isocyanate ethyl (meth)acrylate with a known or well known blocking agent. As the blocking agent for the isocyanate group of 2-isocyanate ethyl (meth) acrylate, an alkylketoxime, a phenol, an alcohol, a β-diketone or a lactam is preferred. Particularly preferred is, for example, methyl ethyl ketoxime, ε-caprolactam, phenol, cresol, acetylacetone, diethyl malonate, isopropanol, t-butyl alcohol or maleic acid imide. Especially preferred is a blocking agent made of a compound having a dissociation temperature of from 120 to 180° C., such as, an alkylketoxime such as methyl ethyl ketoxime, or a lactam such as ε-caprolactam.

The polymeric units (c) are polymeric units of vinyl chloride.

The polymeric units (d) are polymeric units of an alkyl (meth)acrylate. The alkyl (meth)acrylate is preferably one having only one (meth)acryloyl group in one molecule, and the alkyl group is preferably a $C_{3-20}$ linear, branched or cycloalkyl group. It is preferred that hydrogen atoms of the alkyl group are unsubstituted.

Specifically, octadecyl (meth)acrylate, hexadecyl (meth) acrylate, behenyl (meth)acrylate, 2-ethylhexyl (meth) acrylate, t-butyl (meth)acrylate, cyclohexyl (meth)acrylate, isopropyl (meth)acrylate or n-butyl (meth)acrylate may, for example, be mentioned.

In the copolymer of the present invention, at least one member selected from polymeric units (c) and (d) means the polymeric units (c) alone, the polymeric units (d) alone, or both the polymeric units (c) and (d).

In the present invention, the polymeric units (a) may have other groups, in addition to the $R^f$ groups. Likewise, the polymeric units (b) may have other groups other than the $R^f$ group in addition to the blocked isocyanate groups.

Further, the copolymer of the present invention may contain polymeric units of other polymerizable monomers in addition to the above-mentioned polymeric units (a), (b), (c) and (d). By incorporating such polymeric units of other polymerizable monomers, it may sometimes be possible to improve the durability of water and oil repellency, the adhesion of the copolymer to the substrate, the crosslinking or film-forming property, the flexibility, the antifouling property, etc. As such other polymerizable monomers, the following examples may be mentioned.

Ethylene, vinyl acetate, vinyl fluoride, a vinylidene halide, styrene, α-methylstyrene, p-methylstyrene, (meth) acrylamide, diacetone (meth)acrylamide, methylol-modified diacetone (meth)acrylamide, N-methylol (meth)acrylamide, a vinyl alkyl ether, a halogenated alkyl vinyl ether, a vinyl alkyl ketone, butadiene, isoprene, chloroprene, glycidyl (meth)acrylate, aziridinyl ethyl (meth)acrylate, benzyl (meth)acrylate, aziridinyl (meth)acrylate, a (meth)acrylate having a polysiloxane moiety, triallyl cyanurate, allyl glycidyl ether, allyl acetate, N-vinylcarbazole, maleimide, N-methylmaleimide, (2-dimethylamino)ethyl (meth) acrylate and a hydroxyalkyl (meth)acrylate.

The proportions of the respective polymeric units in the copolymer are preferably from 9.9 to 90 parts by weight of the polymeric units (a), from 0.1 to 30 parts by weight of the polymeric units (b), and from 9.9 to 90 parts by weight in total of the polymeric units (c) and/or the polymeric units (d), per 100 parts by weight of the copolymer. When other polymerizable monomers are incorporated, such other polymerizable monomers are preferably within a range of at most 30 parts by weight, per 100 parts by weight of the copolymer.

When the polymeric units (a) are within the above range, the water and oil repellency will be improved, and adequate coating film strength and high durability can be obtained. When the polymeric units (b) are within the above range, durability of water and oil repellency can be obtained, the adhesion to the substrate will be high, and a good influence will be given for the formation of the coating film, whereby the water and oil repellency will be improved. When the polymeric units (c) and/or the polymeric units (d) are within the above range, high water and oil repellency can be obtained, and adequate film-forming property on a substrate and adequate coating film strength can be obtained, whereby a high level of durability will be obtained.

As a method for preparing the copolymer in the present invention, it is possible to employ a method of copolymerizing a polymerizable monomer mixture comprising the (meth)acrylate having a $R^f$ group, the 2-isocyanate ethyl (meth)acrylate with the isocyanate group blocked and at least one member selected from vinyl chloride and an alkyl (meth)acrylate, in the presence of a medium.

As the copolymerization method, a known or well known polymerization method such as bulk polymerization, suspension polymerization, emulsion polymerization, radiation polymerization, photopolymerization or solution polymerization, may be employed. For example, in the case of emulsion polymerization, it is possible to employ a method wherein the polymerizable monomers and an emulsifier are introduced into a medium consisting of water or a solvent mixture of water with a water-soluble solvent, to emulsify the polymerizable monomers, followed by polymerization. In the case of solution polymerization, it is possible to employ a method wherein the polymerizable monomers are dissolved and dispersed in a medium consisting of a solvent or a solvent mixture of water with a solvent, followed by polymerization.

As the solvent to be used for the polymerization, an alcohol such as isopropyl alcohol or 2-butanol, a glycol such as propylene glycol, dipropylene glycol, tripropylene glycol, propylene glycol monomethyl ether, dipropylene glycol monomethyl ether, tripropylene glycol monomethyl ether or ethylene glycol monomethyl ether, a ketone such as acetone, methyl ethyl ketone or methyl isobutyl ketone, an ester such as ethyl acetate or butyl acetate, a hydrocarbon solvent such as hexane, heptane, toluene, xylene or mineral spirit, or a halogenated solvent such as hydrofluorocarbon, hydrochlorofluorocarbon or methylene chloride, may, for example, be employed.

As the polymerization initiating source, a polymerization initiator such as a peroxide, an azo compound or a persulfate, or an ionizable radiation rays such as γ-rays, may, for example, be employed.

The molecular weight of the copolymer obtained by such a method is preferably from $1 \times 10^3$ to $1 \times 10^6$. The composition comprising the copolymer and the medium may be made into a water and oil repellent composition of the present invention by itself or by adjusting the concentration as the case requires.

The water and oil repellent composition of the present invention contains the above copolymer as an effective component, and it is usually a composition comprising the above copolymer and a medium. As the medium, water, a mixture of water with a solvent, or a solvent, is preferred. Particularly preferred is water or a mixture of water with a solvent. The amount of the copolymer in the composition is preferably from 1 to 50 wt %, more preferably from 1 to 30 wt %. This concentration may be optionally changed depending upon the particular purpose or the formulation during use. The water and oil repellent composition of the present invention can be formulated, after obtaining the copolymer, into an optional form such as an emulsion, a suspension, a dispersion, a solution, an aerosol, a gel or the like, in accordance with a conventional method.

Further, the water and oil repellent composition of the present invention may contain other compounds in addition to the above copolymer. As such other compounds, other water repellents or oil repellents, or other polymer blenders, or additives such as a crosslinking agent, an insecticide, a flame retardant, an antistatic agent, an anti-crease agent, etc., may, for example, be mentioned. When such other compounds are incorporated, the amount of such other compounds is preferably from 0.01 to 500 wt %, particularly preferably from 0.1 to 100 wt %, relative to the above copolymer. The types and amounts of other compounds may optionally be changed depending upon the substrate or the purpose of application of the water and oil repellent.

The water and oil repellent composition of the present invention can be applied to a substrate by an optional method. For example, when the water and oil repellent composition of the present invention is an aqueous dispersion or a solvent solution, a method may be employed wherein it is applied to the surface of a substrate by a conventional coating method such as dip coating, followed by drying. The drying may be carried out at room temperature or under heating. When heating is carried out, the temperature is preferably from 40 to 200° C. Further, if necessary, curing may be carried out.

The treated product of the present invention is a treated product having a coating film formed on a substrate surface by applying the water and oil repellent composition to the substrate surface, followed by drying.

The substrate to be treated by the water and oil repellent of the present invention, may, for example, be fibers, fiber fabrics, fiber knitted fabrics, glass, paper, wood, leather, wool, asbestos, bricks, cement, ceramics, metals and metal oxides, porcelains or plastics, preferably fibers, fiber fabrics, or fiber knitted fabrics. The fibers include, for example, animal and plant natural fibers such as cotton, hemp, wool and silk, synthetic fibers such as polyamides, polyesters, polyvinyl alcohols, polyacrylonitriles, polyvinyl chlorides and polypropylene, semisynthetic fibers such as rayon and acetate, inorganic fibers such as glass fibers and asbestos fibers, and mixed fibers thereof.

Now, the present invention will be described in further detail with reference to Examples. However, it should be understood that the present invention is by no means restricted to such specific Examples.

Examples 1 and 2 are Examples for preparing blocked 2-isocyanate ethyl (meth)acrylates, Examples 3 to 6 are Working Examples of the present invention, and Examples 7 to 12 are Comparative Examples.

EXAMPLE 1

Into a four-necked flask made of glass and equipped with a reflux condenser, a thermocouple thermometer and a stirrer, 155 g (1 mol) of 2-isocyanate ethyl methacrylate and methyl isobutyl ketone as a solvent, were charged and heated to 80° C. in a dry nitrogen atmosphere. Then, 87 g (1 mol) of methyl ethyl ketoxime was dropwise added thereto, and a reaction was carried out for 2 hours. Then, by IR, it was confirmed that the absorption by an isocyanate group completely disappeared. By the above reaction, 242 g of a methyl ethyl ketoxime adduct of 2-isocyanate ethyl methacrylate (hereinafter referred to as MIE) was obtained.

EXAMPLE 2

Into a four-necked flask made of glass and equipped with a reflux condenser, a thermocouple thermometer and a stirrer, 155 g (1 mol) of 2-isocyanate ethyl methacrylate and methyl isobutyl ketone as a solvent, were charged and heated to 80° C. in a dry nitrogen atmosphere. Then, 113 g (1 mol) of ε-caprolactam was dropwise added thereto, and a reaction was carried out for 2 hours. Then, by IR, it was confirmed that the absorption by an isocyanate group completely disappeared. By the above reaction, 268 g of an ε-caprolactam adduct of 2-isocyanate ethyl methacrylate (hereinafter referred to as CIE) was obtained.

EXAMPLE 3

Into a 100 ml glass polymerization ampule, 12.0 g (60 parts by weight) of $C_nF_{2n+1}(CH_2)_2OCOCH=CH_2$ (wherein n is an integer of from 6 to 16, the average of n being 9, hereinafter referred to as FA), 7.2 g (36 parts by weight of stearyl methacrylate (hereinafter referred to as STA), 0.4 g (2 parts by weight) of MIE and 0.4 g (2 parts by weight) of 2-hydroxyethyl acrylate (hereinafter referred to as HEA), as polymerizable monomers, 12.0 g of acetone, 35.0 g of water, 1.6 g of a nonionic surfactant (Emulgen 920, tradename, manufactured by Kao Corporation), 0.6 g of stearyl trimethylammonium chloride and 0.1 g of 2,2'-azobis(2-amidinopropane)dihydrochloride, were added and polymerized at 60° C. for 18 hours while shaking in a nitrogen atmosphere, to obtain a composition containing a copolymer. 18 Hours later, the reaction crude solution was analyzed by gas chromatography to confirm that no polymerizable monomers remained.

Water was added to the obtained composition containing a copolymer to obtain a treating bath having the concentration of the copolymer adjusted to be 0.8 wt %. As a cloth to be treated, a tropical cloth made of polyethylene terephthalate (PET) (in the case of evaluation of water resistance, very fine fiber high density polyester taffeta) was dipped in the treating bath and then squeezed by a mangle to have a pick up of 80% (in the case of the evaluation of water resistance, 62%). Then, it was dried at 110° C. for 90 seconds and further subjected to heat treatment at 170° C. for 60 seconds. With respect to the obtained treated product, evaluation was carried out by the following method.

Further, in the durability test of the treated cloth, washing was repeated 20 times by a water washing method in accordance with JIS L0217 separate Table 103, and after drying the cloth in air, evaluation of the performance was carried out. The results are shown in Table 1.

EXAMPLES 4 TO 10

A composition containing a copolymer was obtained by polymerization in the same manner as in Example 3 except that polymerizable monomers as identified in Table 1 were used in amounts (parts by weight) as identified in Table 1. Water was added to the obtained composition containing a copolymer to obtain a treating bath having the concentration of the copolymer adjusted to be 0.8 wt %, and evaluation was carried out in the same manner as in Example 3. The results are shown in Table 1. In Table 1, VCL represents vinyl chloride.

EXAMPLE 11

Into a four-necked flask made of glass and equipped with a reflux condenser, a thermocouple thermometer and a stirrer, 130 g (1 mol) of 2-hydroxyethyl methacrylate was charged, and 222 g (1 mol) of isophorone diisocyanate was added thereto. The mixture was heated to 80° C. in a dry nitrogen atmosphere and maintained for 3 hours. After stirring for 1 hour, it was confirmed by titration that 50% of isocyanate groups was consumed. Further, 87 g (1 mol) of methyl ethyl ketoxime was dropwise added thereto, and a reaction was carried out for 2 hours. Then, by IR, it was confirmed that the absorption by an isocyanate group completely disappeared. By the above reaction, 439 g of a 2-hydroxyethyl methacrylate/isophorone diisocyanate/methyl ethyl ketoxime adduct (hereinafter referred to as MIP) was obtained.

EXAMPLE 12

To the composition containing a copolymer obtained in Example 9, water and an emulsified product of a methyl ethyl ketoxime-blocked diphenylmethane diisocyanate were added to obtain a treating bath having the concentration of the copolymer adjusted to be 0.8 wt % and the concentration of the methyl ethyl ketoxime-blocked diphenylmethane diisocyanate to be 0.5 wt %, and evaluation was carried out in the same manner as in Example 3. The results are shown in Table 1.

Evaluation of Water Repellency

The evaluation was carried out by a spray test in accordance with JIS L1092 and represented by the water repellency number as identified in Table 2. The symbol +(−) attached to the water repellency number means that the respective property is slightly better (poor).

Evaluation of Oil Repellency

The evaluation was carried out in accordance with AATCC-TM118 and represented by the oil repellency number as identified in Table 3. The larger the oil repellency number, the higher the performance. The symbol +(−) attached to the oil repellency number means that the respective property is slightly better (poor).

Evaluation of Water Resistance

The evaluation was carried out in accordance with JIS L1092 water resistance method A (low hydraulic pressure method) (a) hydrostatic pressure method. Unit: mm.

Evaluation of Yellowing

Randomly selected 15 testers compared by visual observation the color of the polyethylene terephthalate tropical cloth before the treatment with the color after the treatment and evaluated the presence or absence of the color change. The evaluation by the majority was adopted.

Evaluation of Texture

The presence or absence of hardening was evaluated in accordance with AATCC (1992) Evaluating Procedure 5.

TABLE 1

| | Example | | | | | | | | | |
|---|---|---|---|---|---|---|---|---|---|---|
| | 3 | 4 | 5 | 6 | 7 | 8 | 9 | 10 | 11 | 12 |
| FA | 60 | 60 | 70 | 70 | 70 | 70 | 70 | 60 | 60 | 70 |
| STA | 36 | 38 | | | 30 | 28 | | | | |
| VCL | | | 28 | 28 | | | 28 | | 38 | 28 |
| HEA | 2 | | | | | 2 | 2 | | | 2 |
| MIE | 2 | 2 | 2 | | | | | 38 | | |
| CIE | | | | 2 | | | | 2 | | |
| MIP | | | | | | | | | 2 | |
| Water repellency | | | | | | | | | | |
| Before washing | 100 | 100 | 100 | 100 | 90+ | 100 | 100 | 80 | 100 | 100 |
| After washing | 90 | 90 | 90+ | 90+ | 50 | 50 | 50 | 80 | 70 | 80 |
| Oil repellency | | | | | | | | | | |
| Before washing | 6 | 6 | 6 | 7 | 4 | 5 | 5 | 5 | 6 | 5 |
| After washing | 5 | 5 | 5 | 6 | 1 | 1 | 1 | 4− | 2 | 3+ |
| Yellowing | Nil | Nil | Nil | Nil | Nil | Nil | Nil | Nil | Nil | observed |
| Hardening of texture | Nil | Nil | Nil | Nil | Nil | Nil | Nil | Nil | Nil | observed |
| Water resistance | | | | | | | | | | |
| Before washing | 450 | 450 | 460 | 440 | 370 | 360 | 350 | 380 | 400 | 450 |
| After washing | 350 | 360 | 340 | 350 | 260 | 250 | 250 | 320 | 290 | 360 |

TABLE 2

| Water repellency number | State |
|---|---|
| 100 | The surface is free from deposition or wetting |
| 90 | Slight deposition or wetting is observed on the surface |
| 80 | Partial wetting is observed on the surface |
| 70 | Wetting is observed on the surface |
| 50 | Wetting is observed over the entire surface |
| 0 | Both the front and rear surfaces are completely wetted |

TABLE 3

| Oil repellency number | Test liquid | Surface tension of the test liquid (dyn/cm at 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65 parts of nujoule/35 parts of hexadecane | 29.6 |
| 1 | Nujoule | 31.2 |

It was confirmed that the same results as in Table 1 are obtainable even when tripropylene glycol monomethyl ether, propylene glycol or dipropylene glycol monomethyl ether is used instead of acetone.

With the water and oil repellent composition of the present invention, excellent water and oil repellency and water resistance can be imparted. Further, the water and oil repellency and water resistance imparted by the composition of the present invention undergoes no substantial change against a physical influence such as washing and thus are excellent also from the viewpoint of durability. Further, to a cloth treated with the composition, the above properties are imparted even to a cloth made of synthetic fibers where no reactive groups are substantially present on the surface of fibers. Further, there is a merit in that the treated cloth is free from yellowing or hardening of the texture.

What is claimed is:

1. A water and oil repellent composition containing, as an effective component, a copolymer comprising the following polymeric units (a), (b), and at least one member selected from (c) and (d):
    polymeric units (a) of a (meth)acrylate having a polyfluoroalkyl group;
    polymeric units (b) of 2-isocyanate ethyl (meth)acrylate with the isocyanate group blocked;
    polymeric units (c) of vinyl chloride; and
    polymeric units (d) of an alkyl (meth)acrylate
    with the proviso that said copolymer does not contain a polymeric unit of a (meth)acrylate having a polyoxyalkylene chain.

2. The water and oil repellent composition according to claim 1, wherein the polymeric units (b) are polymeric units of 2-isocyanate ethyl (meth)acrylate blocked with methyl ethyl ketoxime or ε-caprolactam.

3. The water and oil repellent composition according to claim 2, wherein the polymeric units (a) are polymeric units of a (meth)acrylate wherein a polyfluoroalkyl group is present in an alcohol residue of the (meth)acrylate.

4. The water and oil repellent composition according to claim 2, wherein the polymeric units (a) are polymeric units of a (meth)acrylate having a $C_{6-16}$ polyfluoroalkyl group.

5. The water and oil repellent composition according to claim 2, wherein the polymeric units (d) are polymeric units of an alkyl (meth)acrylate containing only one (meth)acryloyl group in one molecule, wherein the alkyl group is a $C_{3-20}$ alkyl group with hydrogen atoms unsubstituted.

6. The water and oil repellent composition according to claim 1, wherein the polymeric units (a) are polymeric units of a (meth)acrylate wherein a polyfluoroalkyl group is present in an alcohol residue of the (meth)acrylate.

7. The water and oil repellent composition according to claim 6, wherein the polymeric units (a) are polymeric units of a (meth)acrylate having a $C_{6-16}$ polyfluoroalkyl group.

8. The water and oil repellent composition according to claim 6, wherein the polymeric units (d) are polymeric units of an alkyl (meth)acrylate containing only one (meth) acryloyl group in one molecule, wherein the alkyl group is a $C_{3-20}$ alkyl group with hydrogen atoms unsubstituted.

9. The water and oil repellent composition according to claim 1, wherein the polymeric units (a) are polymeric units of a (meth)acrylate having a $C_{6-16}$ polyfluoroalkyl group.

10. The water and oil repellent composition according to claim 9, wherein the polymeric units (d) are polymeric units of an alkyl (meth)acrylate containing only one (meth) acryloyl group in one molecule, wherein the alkyl group is a $C_{3-20}$ alkyl group with hydrogen atoms unsubstituted.

11. The water and oil repellent composition according to claim 1, wherein the polymeric units (d) are polymeric units of an alkyl (meth)acrylate containing only one (meth) acryloyl group in one molecule, wherein the alkyl group is a $C_{3-20}$ alkyl group with hydrogen atoms unsubstituted.

12. The water and oil repellent composition according to claim 1, wherein the copolymer comprises from 9.9 to 90 parts by weight of the polymeric units (a), from 0.1 to 30 parts by weight of the polymeric units (b), and from 9.9 to 90 parts by weight in total of the polymeric units (c) and/or (d), per 100 parts by weight of the copolymer.

13. The water and oil repellent composition according to claim 1, which comprises an aqueous medium and, as an effective component, the copolymer comprising the polymeric units (a), (b), and (c) and/or (d), dispersed in the aqueous medium.

14. A method for producing a water and oil repellant composition, which comprises copolymerizing a polymerizable monomer mixture comprising a (meth)acrylate having a polyfluoroalkyl group, 2-isocyanate ethyl (meth) acrylate with the isocyanate group blocked and at least one member selected from vinyl chloride and an alkyl (meth) acrylate, in the presence of a medium, with the proviso that said polymerizable monomer mixture does not contain a (meth)acrylate having a polyoxyalkylene group.

15. The method for producing a water and oil repellent composition according to claim 14, wherein the medium is an aqueous medium.

16. A treated product having a coating film formed on a substrate surface by applying the water and oil repellent composition as defined in claim 1 to the substrate surface, followed by drying.

17. The treated product according to claim 16, wherein the substrate is fibers, fiber woven fabrics or fiber knitted fabrics.

* * * * *